Figure 1:
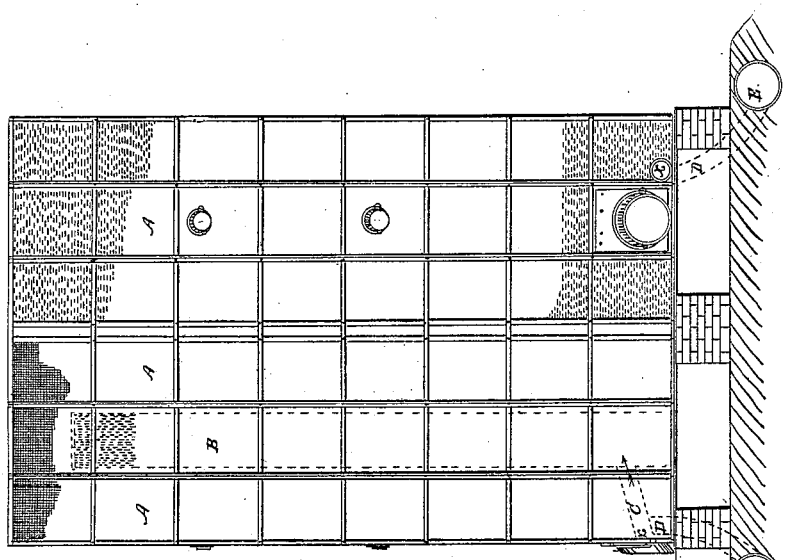
Figure 2:
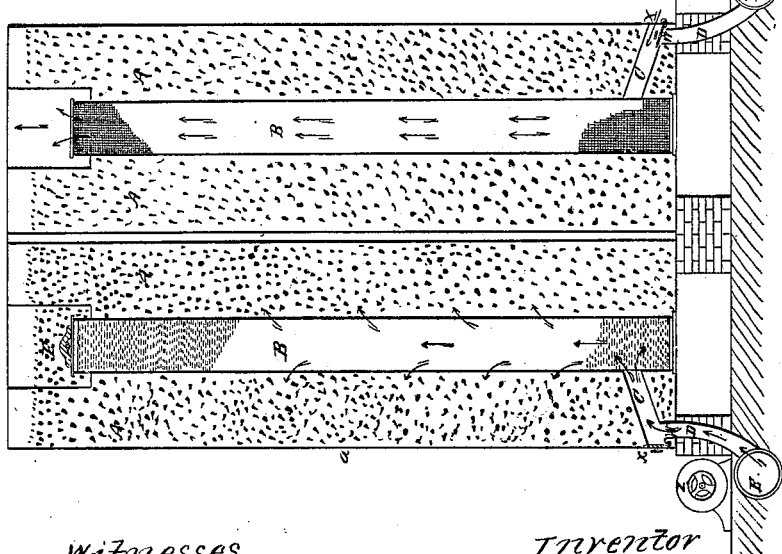

Sheet 1.-2 Sheets.

A. C. L. Devaux,
Grain Ventilator,
Nº 39,030. Patented June 30, 1863.

Witnesses
J. W. Coombs
G. W. Reed

Inventor
A. C. L. Devaux
per Munn & Co
Att'ys

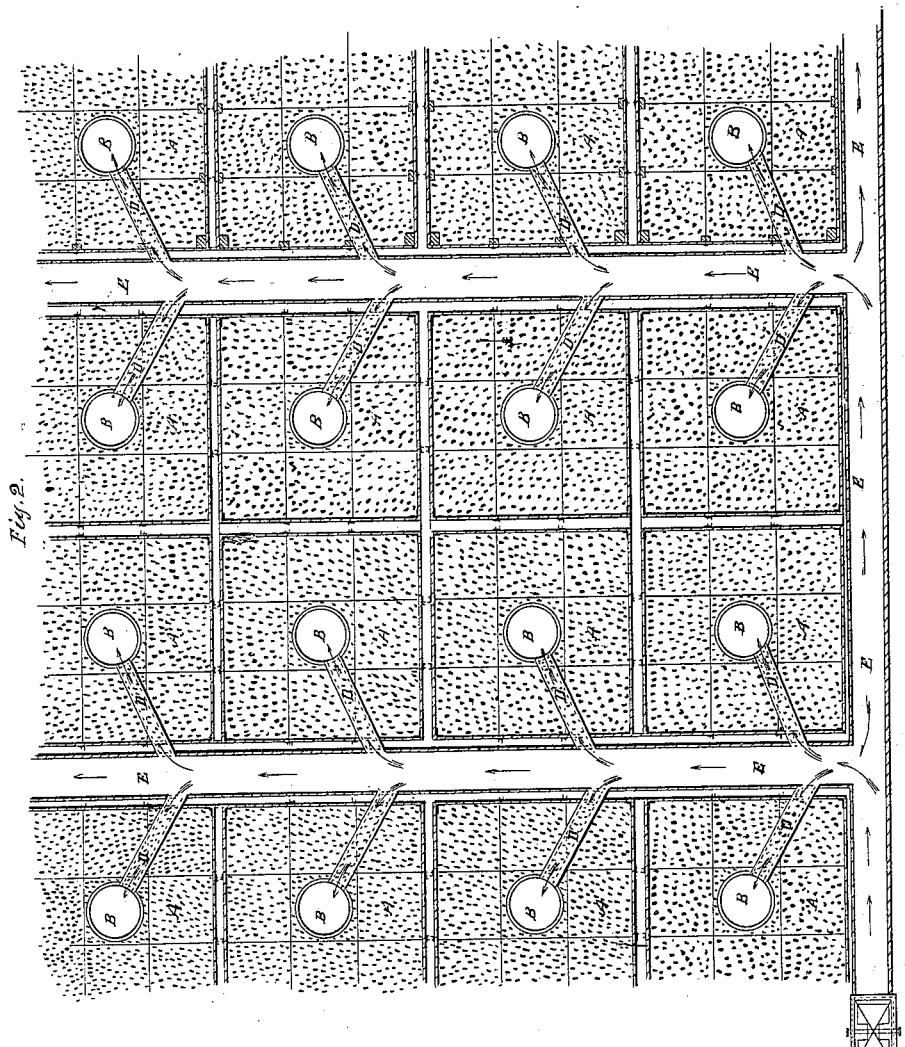

UNITED STATES PATENT OFFICE.

A. C. L. DEVAUX, OF KING WILLIAM STREET, LONDON, ENGLAND.

IMPROVEMENT IN GRANARIES.

Specification forming part of Letters Patent No. 39,030, dated June 30, 1863.

*To all whom it may concern:*

Be it known that I, ALEXANDER CHARLES LOUIS DEVAUX, of King William Street, in the city of London, England, merchant, have invented Improvements in the Construction of Granaries; and I do hereby declare that the following is a full and exact description of the said invention.

The invention which forms the subject of the present application for a patent relates to a novel construction of granary, by which perfect preservation of the grain placed therein may be insured by means of natural aeration combined with artificial ventilation. These operations of natural aeration and artificial ventilation may be employed either separately or in combination, according to the requirements of the case.

Having thus summarily explained the nature of the invention, I will now proceed to describe the same in detail, reference being had to the accompanying drawings, in which—

Figure I is an elevation of the apparatus for effecting the above-mentioned objects. Fig. II is a plan or bird's-eye view of the same, and Fig. III is a vertical section of two contiguous chambers.

According to my invention the granaries consist of chambers called "aerators," and which may be either of a square, cylindrical, or other form, and of different heights and dimensions, according to the purposes for which they are intended to be employed.

In the accompanying drawings the aerating-chambers A A are represented of a square form, their sides, Fig. II, being made of perforated sheet metal, wire-gauze, metallic lattice-work, or any other suitable material. They are so constructed and arranged as to leave passages for the circulation of air between each of them. In each aerating-chamber is placed a tube, B, extending from top to bottom thereof, which tube is made of wire-gauze, perforated metal, or any other suitable material, and the diameter of which varies according to the breadth or capacity of the aerating-chambers. The grain is therefore deposited in the space between the central tube, B, and the sides *a* of the aerating-chambers A. The layer of grain is vertical, instead of being horizontal, as is the case with ordinary granaries.

In order to produce natural aeration in the interior of the aerating-chambers, a passage is established for a current of air by means of a pipe, C, between the central tube, B, and the exterior *a* of each aerating-chamber near its base. Artificial ventilation is produced by putting the central tube, B in, communication with a ventilator, *h*, or with blowing apparatus, by means of pipes C and D and the air-passage E. When this artificial ventilation is applied, I close the pipe C at its mouth by means of a valve or cover, X. The central tube, B, is also closed at top by a cover, F, which is then covered with corn, as seen in the left-hand chamber of Fig. III. The mouth W of the pipe D is then opened and the air is propelled by the ventilator *h* into the central tube, and, being unable to escape at top, is obliged to pass through the perforations in the central tube, B, and traverse the layer of corn surrounding the central tube, and then make its exit through the perforated sides *a* of the chamber.

Instead of causing the air to act as above described, the blower may be made to draw out or exhaust the air, and a vacuum being thus established in the central tube the surrounding air will pass through the mass of grain and the perforated sides *a* to the central tube, B. During the whole time that the artificial ventilation is not employed I leave open the mouth X of the pipe C and close the mouth W of the tube D, as represented in the right-hand chamber of Fig. III. I also open the central tube, B, at the top, by removing the cover F, after having removed the corn which covers it, when it is desired to obtain artificial ventilation. The central tube, B, being then open at top, acts as a kind of draft chimney with the pipe C, which is open at bottom, and the more heated the corn is the more powerful will be the current of air that rushes into and through it. The layer of corn, which is comparatively thin, is thus always in contact with the surrounding air, and is, as it were, licked by it outside, by means of the perforations of the sides *a* of the chamber, and inside by the perforations of the tube B, which communicates with the atmosphere by the pipe C and the opening at top. This natural aeration does not, however, allow me to entirely dispense with the artificial ventilation, as I sometimes find the artificial ventilation useful and even necessary, according to the different qualities of grain, for the purpose of lowering the temperature quickly and freeing it from any insects which it may contain. The aerating-chambers being independent of each other, the artificial ventilation may be carried on in each one separately, or in several or the whole of t em at one time. This is also the case with the natural aeration. I would remark, in conclusion, that the artificial ventilation and natural aeration are, according to my system, both necessary for the effective and economical preservation of stored grain.

Having thus described my invention, what I claim as new, and desire to secure by Letters Patent, is—

1. The grain-receptacles A, when made with perforated walls and an air-space between the receptacles, in combination with the central perforated air-tubes, B, as herein shown and described.

2. The lateral air-pipes C, in combination with the central tubes, B, and receptacles A, as herein shown and described.

In witness whereof I, the said ALEXANDER CHARLES LOUIS DEVAUX, have hereunto set my hand and seal this 23d day of February, 1863.

A. C. L. DEVAUX. [L. S.]

Witnesses:
 ARTHUR W. McLELLAN,
 GEORGE BRIDE LENWAY,
  *Both of 7 Pope's Head Alley, London*